June 29, 1926.

A. W. GRIMM

MAIN DRAIN

Filed August 2, 1924

1,590,365

A. W. Grimm,
INVENTOR

BY Victor J. Evans
ATTORNEY

P. T. Hickey
WITNESS:

Patented June 29, 1926.

1,590,365

UNITED STATES PATENT OFFICE.

ARTHUR W. GRIMM, OF NOGALES, ARIZONA, ASSIGNOR OF ONE-HALF TO FRANK D. PHILLIPS, OF NOGALES, ARIZONA.

MAIN DRAIN.

Application filed August 2, 1924. Serial No. 729,851.

This invention relates to gas mains or conduits, an object being to provide means included in the main or conduit for trapping moisture and the like and automatically discharging the latter so as to keep the main free from moisture.

Another object of the invention is the provision of a device of the above character which is simple in construction, reliable in operation and which may be conveniently installed.

With the above and other objects in view, the invention further includes the following novel features and details of construction, to be hereinafter more fully described, illustrated in the accompanying drawings and pointed out in the appended claim.

In the drawings:—

Figure 1:
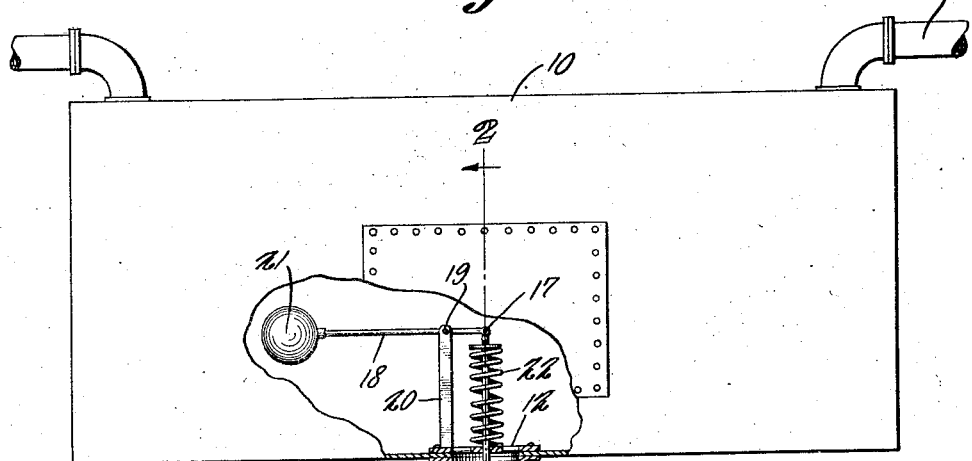
Figure 1 is an elevation partly broken away illustrating the invention.
Figure 2:
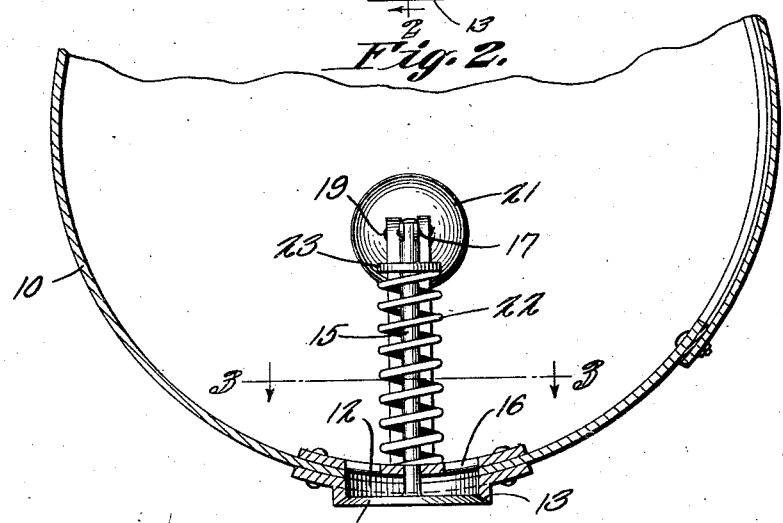
Figure 2 is an enlarged sectional view taken substantially on the line 2—2 of Figure 1.
Figure 3:
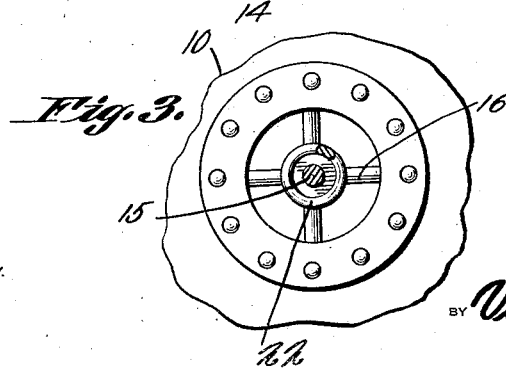
Figure 3 is a section on the line 3—3 of Figure 2.

Referring to the drawings in detail wherein like characters of reference denote corresponding parts, the reference character 10 indicates a tank or container to the opposite ends of which are connected a gas main or conduit 11, the container being disposed below the main or conduit and arranged so that gas passing through the main will pass through the container and the latter will form a trap for trapping moisture.

The container 10 is provided with a discharge port 12 and surrounding this port is a seat 13 for a disk or valve member 14. Extending from this disk or valve member is a stem 15 which is guided through a spider 16, while the upper end of this stem has pivotally connected thereto as shown at 17, one end of a lever. The lever is pivotally mounted as indicated at 19 to the upper end of a standard or bracket 20 and carries at its outer end a float 21.

Surrounding the stem 15 is a coiled spring 22, one end of which bears upon the spider 16 while the opposite end bears against a disk or collar 23 secured upon the stem 15.

When the moisture within the container 10 reaches a predetermined height, the float 21 will be elevated so that the disk or valve 14 will move outward against the action of the spring 22 and permit moisture to pass through the outlet port 12. As soon as the moisture reaches a proper level, the valve or outlet port will be closed by the spring 22.

The invention is susceptible of various changes in its form, proportions and minor details of construction and the right is herein reserved to make such changes as properly fall within the scope of the appended claim.

Having described the invention what is claimed is:—

The combination with a gas conduit, of a tank located below the level of the conduit and having its opposite ends connected to said conduit, whereby gas passing through the conduit will pass through the tank, a discharge port for the tank, a spider secured over the port, a valve seat surrounding the port and spaced from the spider, a valve for the seat, a vertically disposed stem extending from the valve into the tank and guided through the spider, a collar upon the stem, a spring located upon the stem between the collar and spider to seat the valve, a standard rising from the spider, a horizontally disposed arm pivotally mounted within the standard and having one end pivotally secured to the stem and a float at the other end of the arm to open the valve when a predetermined amount of liquid collects within the tank.

In testimony whereof I affix my signature.

ARTHUR W. GRIMM.